United States Patent
Singh

(10) Patent No.: US 11,284,459 B2
(45) Date of Patent: Mar. 22, 2022

(54) DATA ACCESS SECURITY

(71) Applicant: iBasis, Inc., Lexington, MA (US)

(72) Inventor: Manpreet Singh, Lexington, MA (US)

(73) Assignee: iBasis, Inc., Lexington, MA (US)

( * ) Notice: Subject to any disclaimer, the term of this patent is extended or adjusted under 35 U.S.C. 154(b) by 0 days.

(21) Appl. No.: 16/888,293

(22) Filed: May 29, 2020

(65) Prior Publication Data

US 2021/0378036 A1 Dec. 2, 2021

(51) Int. Cl.

| | |
|---|---|
| *H04W 76/12* | (2018.01) |
| *H04W 84/04* | (2009.01) |
| *H04W 8/02* | (2009.01) |
| *H04W 12/06* | (2021.01) |
| *H04W 12/71* | (2021.01) |
| *H04W 12/72* | (2021.01) |

(52) U.S. Cl.
CPC ............. *H04W 76/12* (2018.02); *H04W 8/02* (2013.01); *H04W 12/06* (2013.01); *H04W 12/71* (2021.01); *H04W 12/72* (2021.01); *H04W 84/042* (2013.01)

(58) Field of Classification Search
CPC .................. H04W 84/045; H04L 61/2007
USPC .................. 455/433; 370/328, 218
See application file for complete search history.

(56) References Cited

U.S. PATENT DOCUMENTS

| | | |
|---|---|---|
| 9,572,037 B2 | 2/2017 | Puri et al. |
| 2004/0203750 A1 | 10/2004 | Cowdrey et al. |
| 2010/0316029 A1* | 12/2010 | Kappler ............. H04L 41/0813 370/338 |
| 2014/0169286 A1* | 6/2014 | Xu ........................ H04W 8/082 370/329 |

(Continued)

FOREIGN PATENT DOCUMENTS

| | | |
|---|---|---|
| EP | 3 496 439 A1 | 6/2019 |
| WO | 2016/148685 A1 | 9/2016 |

OTHER PUBLICATIONS

Universal Mobile Telecommunications System (UMTS); LTE;3GPP Evolved Packet System (EPS);Evolved General Packet Radio Service (GPRS)Tunnelling Protocol for Control plane (GTPv2-C);Stage 3 (3GPP TS 29.274 version 12.6.0 Release 12) Oct. 2014 (316 pages).

*Primary Examiner* — Kiet M Doan
(74) *Attorney, Agent, or Firm* — Hamilton, Brook, Smith & Reynolds, P.C.

(57) ABSTRACT

An apparatus and corresponding method defend an interconnect communications network from a fraud committed via general packet radio service (GPRS) tunneling protocol (GTP). The apparatus provides data access security in the communications network. The apparatus is included in an interconnect network of the communications network. The apparatus comprises a communications interface and a processor. The processor is configured to authenticate a general packet radio service (GPRS) tunnel protocol (GTP) request to create a new session by authenticating network and (Continued)

subscriber information included in the GTP request. The network and subscriber information are received via the communications interface. The processor is further configured to provide the data access security by preventing access to data, accessed via the interconnect network using a GTP tunnel established for the new session, by blocking the GTP tunnel from being established in an event the GTP request cannot be authenticated.

47 Claims, 12 Drawing Sheets

(56) References Cited

U.S. PATENT DOCUMENTS

2016/0241600 A1\* 8/2016 Khan .................. H04L 61/6022
2018/0367578 A1\* 12/2018 Verma ..................... H04L 63/10

\* cited by examiner

DATA ACCESS SECURITY

BACKGROUND

A mobile cellular telephony/data network may include several cooperating nodes and/or gateways to authenticate a user device's attachment to the network, authorize services, and establish data and voice paths for the user device through the network to other mobile users, other mobile networks, and the Internet. In a third-generation (3G) network, a data path for a user device is provided by specialized routers, such as serving general packet radio service (GPRS) support nodes (SGSNs) for the radio edge and gateway GPRS support nodes (GGSNs) for the Internet edge. In a fourth-generation (4G) network, such as an evolved packet system (EPS) or long-term evolution (LTE) network, serving gateways (S-GWs) and packet data network gateways (P-GWs) provide a similar voice and data path through a visited (roaming) wireless communications network and a home wireless communications network for a user device, also referred to interchangeably herein as user equipment (UE).

In a 3G and 4G network, authentication and subscription information of a subscriber is maintained by a home location register (HLR) and home subscriber server (HSS), respectively. Alternate network paths, such as signaling system no. 7 (SS7) for 3G and diameter signaling for 4G, may be provided to the user device using the authentication and subscription information of the subscriber obtained from the HLR or the HSS.

In such 3G and 4G networks, a GPRS tunneling protocol (GTP) tunnel is established between a serving node (e.g., SGSN/S-GW) and a gateway node (e.g., GGSN/P-GW) to allow a user device to move from one location to another location, while continuing to connect to an external packet switched network, such as the Internet. The GTP tunnel is divided into two separate planes, GTP-U and GTP-C. GTP-U is used to carry user-data traffic, that is, network traffic generated from the user device when accessing the Internet (e.g., email, web surfing, gaming, etc.), whereas GTP-C is used to carry control signals within a GPRS-based core network for signaling between a SGSN/S-GW and GGSN/P-GW including session establishment, teardown, and other session related signaling.

When the user device is connected or disconnected to a mobile network, or hops inside the mobile network, the mobile switching center (MSC) or mobile management entity (MME) detects the move of the user device and the SGSN/S-GW sends appropriate modify/connect/disconnect signals to the GGSN/P-GW that serves the user device. The GGSN/P-GW receives a request for a new session, such as a Create Session Request message, and a GTP tunnel is established to a requesting subscriber based on the Create Session Request.

SUMMARY

According to an example embodiment, an apparatus provides data access security in a communications network. The apparatus is included in an interconnect network of the communications network. The apparatus comprises a communications interface and a processor. The processor is configured to authenticate a general packet radio service (GPRS) tunnel protocol (GTP) request to create a new session by authenticating network and subscriber information included in the GTP request. The network and subscriber information are received via the communications interface. The processor is further configured to provide the data access security by preventing access to data, accessed via the interconnect network using a GTP tunnel established for the new session, by blocking the GTP tunnel from being established in an event the GTP request cannot be authenticated.

In an event the GTP request is authenticated, the processor is further configured to enable the GTP tunnel to be established.

The network information may include a public land mobile network (PLMN) identifier and the processor may be further configured to authenticate the network information by confirming that the PLMN identifier is valid.

The processor may be further configured to confirm that the PLMN identifier is valid by confirming that the PLMN identifier is present in a list of valid PLMN identifiers included in a Global System of Mobile Communications Association (GSMA) roaming database.

In an event the PLMN identifier is confirmed to be valid, the processor may be further configured to authenticate the network information by confirming that a source internet protocol (IP) address of an outermost header of the GTP request belongs to a PLMN identified by the PLMN identifier.

The processor may be further configured to confirm that the source IP address belongs to the PLMN based on data stored in a Global System of Mobile Communications Association (GSMA) roaming database.

The subscriber information may include an international mobile subscriber identity (IMSI). To authenticate the subscriber information, the processor may be further configured to verify that the IMSI is provisioned to be enabled in the interconnect network.

To verify that the IMSI is provisioned to be enabled in the interconnect network, the processor may be further configured to access a database included in the interconnect network to confirm that the IMSI is a) present among a plurality of international mobile subscriber identities (IMSIs) stored in the database and b) associated with an enabled state.

The interconnect network may be communicatively coupled to a home wireless communications network. The network information may include a PLMN identifier. To authenticate the subscriber information, the processor may be further configured to query the home wireless communications network to confirm that the IMSI is attached, presently, to a PLMN associated with the PLMN identifier.

To query the home wireless communications network to confirm that the IMSI is attached, presently, to the PLMN, the processor may be further configured to query a Home Location Register (HLR) or Home Subscriber Server (HSS) of the home wireless communications network.

The processor may be further configured to authenticate the GTP request by authenticating user device information included in the GTP request. The user device information may be received via the communications interface.

The subscriber information may include an IMSI. The user device information may include an international mobile equipment identifier (IMEI). The processor may be further configured to authenticate the user device information by validating a mapping of the IMEI to the IMSI.

To validate the mapping of the IMEI to the IMSI, the processor may be further configured to determine whether there is an active GTP session associated with the IMSI and a different IMEI relative to the IMEI of the GTP request and, in an event such active GTP session associated with the different IMEI is determined to be active, conclude that the mapping of the IMEI to the IMSI is invalid.

The user device information may include an IMEI. To authenticate the user device information, the processor may be further configured to access a database included in the interconnect network to determine whether the IMEI is present in the database. In an event the IMEI is not present in the database, the processor may be further configured to enable the GTP tunnel to be established.

In an event the IMEI is present in the database, the processor may be further configured to determine whether the IMEI is mapped, in the database, to at least one IMSI. In an event the IMEI is not mapped to any IMSI in the database, the processor may be further configured to enable the GTP tunnel to be established.

The subscriber information may include an IMSI. In an event the IMEI is mapped to the at least one IMSI in the database, the processor may be further configured to determine whether the IMEI matches an integrated circuit card identifier (ICCID) or an embedded universal integrated circuit card (eUICC) identifier (ID) that is mapped, in the database, to the IMSI included in the subscriber information of the GTP request. In an event (i) the IMEI does match the ICCID or eUICC ID and (ii) the ICCID or eUICC ID is mapped to a radio access type (RAT) in the database, the processor may be further configured to determine whether the RAT matches a given RAT included in the GTP request. In an event (iii) the IMEI does match the ICCID or eUICC ID and (iv) the ICCID or eUICC ID is mapped to an access point name (APN) in the database, the processor may be further configured to determine whether the APN matches a given APN included in the GTP request.

In an event the GTP request is authenticated, the processor may be further configured to enable the GTP tunnel to be established, determine whether data traffic statistics, associated with user data transported over the GTP tunnel established and monitored over a time period, violate a traffic profile associated with a given ICCID or given eUICC ID, the given ICCID or eUICC ID mapped to the IMEI in a database of the interconnect network. In an event the data traffic statistics violate the traffic profile, the processor may be further configured to (i) activate an alarm associated with the GTP tunnel established, (ii) delete the GTP tunnel established, (iii) throttle a data speed of data being transported over the GTP tunnel established, or (iv) a combination thereof.

To determine whether the data traffic statistics violate the traffic profile associated with the given ICCID or eUICC ID, the processor may be further configured to retrieve call detail records (CDRs) associated with the given ICCID or eUICC ID from a database included in the interconnect network and to generate the data traffic statistics from the CDRs retrieved.

The interconnect network communicatively may couple a visited wireless communications network and a home wireless communications network.

The interconnect network further includes a packet data network gateway (P-GW) or gateway GPRS support node (GGSN). The apparatus is communicatively coupled to the P-GW or GGSN in the interconnect network.

The apparatus is communicatively coupled to the P-GW or GGSN via the communications interface. To block the GTP tunnel from being established, the processor may be further configured to send a first control signal to the P-GW or GGSN via the communications interface, the first control signal preventing the P-GW or GGSN from establishing the GTP tunnel. In an event the GTP request can be authenticated, the processor may be further configured to send a second control signal to the P-GW or GGSN via the communications interface. The second control signal may cause the P-GW or GGSN to establish the GTP tunnel.

The interconnect network may be a GPRS roaming exchange (GRX) network or an internet protocol (IP) exchange (IPX) network.

The GTP request may originate from a device that is external to the interconnect network.

Alternative method embodiments parallel those described above in connection with the example system embodiment.

Further, yet another example embodiment includes a non-transitory computer-readable medium having stored thereon a sequence of instructions which, when loaded and executed by a processor, causes the processor to perform methods disclosed herein.

It should be understood that example embodiments disclosed herein can be implemented in the form of a method, apparatus, system, or computer readable medium with program codes embodied thereon.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.

Security holes may exist in a communications system that employs a general packet radio service (GPRS) tunneling protocol (GTP) because a GTP tunnel established between a serving GPRS support node (SGSN) or serving gateway (S-GW) and a gateway GPRS support node (GGSN) or packet data network gateway (P-GW) has no authentication or authorization facilities. For example, in a typical 3G/4G network, a GGSN/P-GW accepts all Create Session Request messages and establishes GTP tunnels absent authentication of such messages. While a typical mobile network operator (MNO) may employ an external firewall for source internet protocol (IP) based blocking, such blocking is performed at a third network layer (i.e., Layer-3) within data packets and does not access information within data packets indicative of user-specific or session specific data flows, e.g., information associated with the fourth transport layer (i.e., Layer-4) and/or fifth session layer (i.e., Layer-5). As such, subscriber level information, such as an international mobile subscriber identity (IMSI) or other information associated with a subscriber, network level information, such as a public land mobile network (PLMN) identifier or other network level information associated with a network, or user level information present in the data packets, is not authenticated. An attacker, also referred to interchangeably herein as a fraudster, may exploit same, such as disclosed below with regard to FIG. 1. It should be understood that example embodiments disclosed herein are not limited to 3G/4G networks and may be employed in any communications network that employs GTP, such as a 5G network or other communications network.

Figure 1:
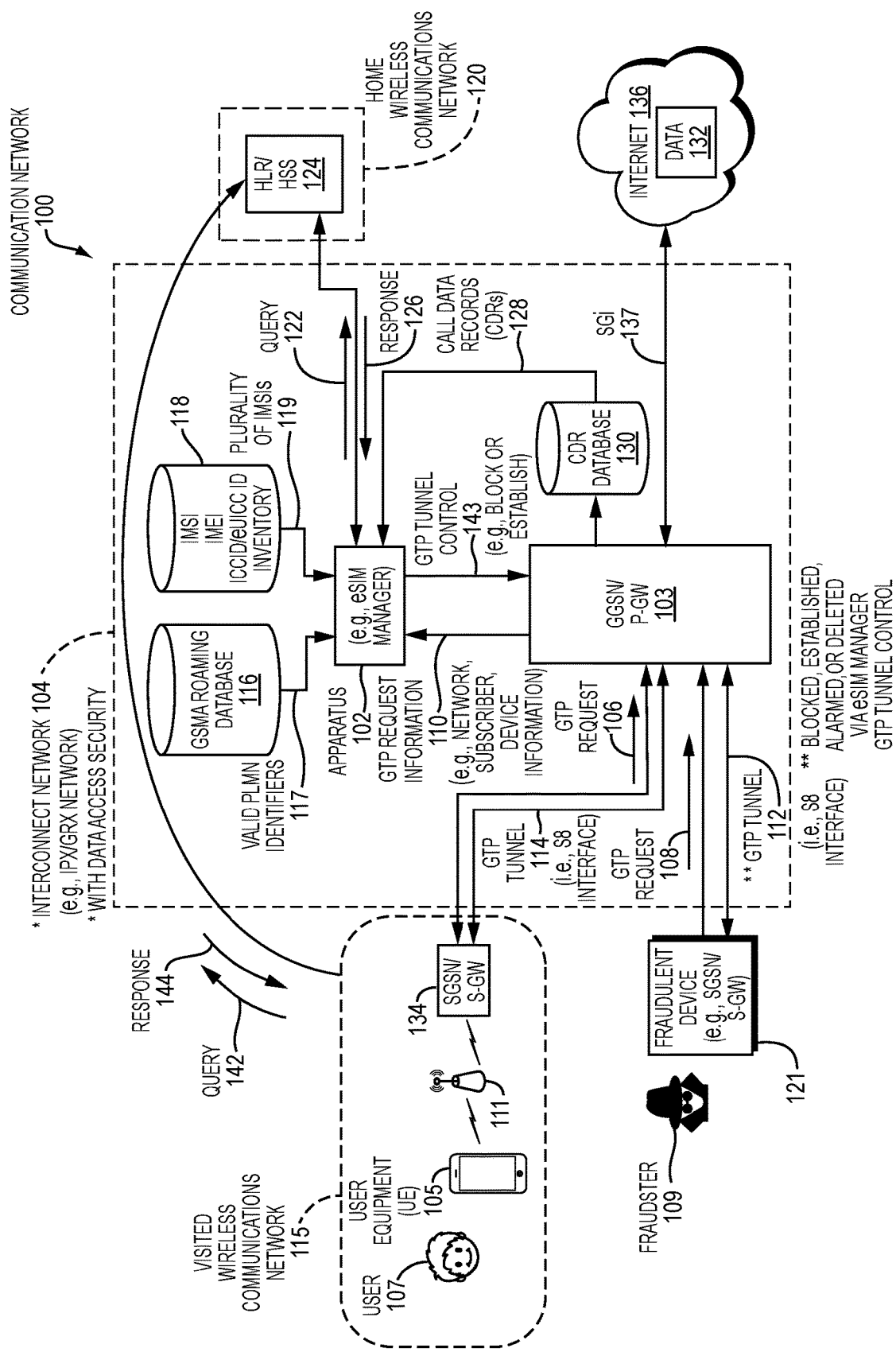
FIG. 1 is a block diagram of an example embodiment of a communications network.

FIG. 1 is a block diagram of an example embodiment of a communications network 100. The communications network 100 includes an apparatus 102, referred to interchangeably herein as an embedded electronic subscriber identity module (eSIM) manager, that is configured to defend the communications network 100 from a fraud committed via general packet radio service (GPRS) tunneling protocol (GTP). The apparatus 102 may be referred to interchangeably as an eSIM manager because the apparatus 102 accesses the database 118 that includes subscriber profiles and has logic for switching subscriber profiles that are active on eSIMs of remote devices. The eSIM manager includes logic to allow and disallow connections for such subscriber profiles. The apparatus 102 is included in an interconnect network 104 of the communications network 100. According to an example embodiment, the interconnect network 104 is a GPRS roaming exchange (GRX) network or an internet protocol (IP) exchange (IPX) network.

The communications network 100 includes a home wireless communications network 120, such as a third-generation (3G) network, long-term evolution (LTE) network, or other type wireless communications network to which a user equipment (UE) 105, or a respective user 107, is subscribed. The UE 105 may be any type of user device, such as a mobile phone, internet of things (IoT) device, or any other device with an eSIM with a subscriber profile that is managed by the apparatus 102, that is, the eSIM manager. The communications network 100 further includes a visited wireless communications network 115, such as a 3G network, LTE network, or other type of wireless communications network. In the example embodiment, the UE 105 is roaming in the visited wireless communications network 115 and, as such, the UE 105 is attached to the visited wireless communications network 115. It should be understood, however, that the UE 105 may instead be attached to the home wireless communications network 120.

The interconnect network 104 communicatively couples the visited wireless communications network 115 and the home wireless communications network 120. The interconnect network 104 further includes a packet data network gateway (P-GW) or gateway GPRS support node (GGSN), that is, the GGSN/P-GW 103. The apparatus 102 comprises a communications interface (not shown). The communications interface may be any type of signaling interface, such as a Diameter-based (e.g., Gx, S6b), AAA over RADIUS-based, or other signaling interface, or an application programming interface (API) carrying signaling data. According to an example embodiment, the apparatus 102 is communicatively coupled to the GGSN/P-GW 103 in the interconnect network 104 via the communications interface.

In the example embodiment, the visited wireless communications network 115 includes a radio access element 111, such as a NodeB for 3G, evolved node B (eNodeB) for 4G, or other type of radio access element that is configured to communicate with mobile devices, e.g., the UE 105. The type of the radio access element 111 may be based on the wireless mobile telecommunications technology employed, such as 3G/4G/5G, or another wireless mobile telecommunications technology. The radio access element 111 is communicatively coupled to a SGSN/S-GW 134 within the visited wireless communications network 115. Upon a request for data access by the roaming UE 105, to access, for example, the data 132 of the Internet 136, the SGSN/S-GW 134 sends a general packet radio service (GPRS) tunnel protocol (GTP) request 106 to the GGSN/P-GW 103 to create a new session by establishing the GTP tunnel 114, also referred to interchangeably herein as an S8 interface. The GTP tunnel 114 may support an IP connection between the SGSN/S-GW 134 of the visited wireless communications network 115 and the GGSN/P-GW 103 of the interconnect network 104.

Depending on the type of data access or service requested by the roaming UE 105, the apparatus 102 together with the GGSN/P-GW 103 provide access of data such as the data 132 of the Internet 136 or other network, such as a private network (not shown) of the home wireless communications network 120. For example, if the service requested by the roaming UE 105 relates to accessing the Internet 136, respective data packets are routed between the GGSN/P-GW 103 and the Internet 136, for example, through the SGi communications link 137. Therefore, Internet access is provided to the roaming UE 105 over a communication path running from the visited wireless communications network 115 to the Internet 136 via the interconnect network 104. It should be understood that while the SGi communications link 137 is shown as a single communications link, the SGi communications link 137 may include a plurality of SGi communications links wherein each SGi communications link is associated with a respective user device connection to the Internet 136.

Prior to sending the GTP request 106, the visited wireless communications network 115 may send a query 142 to a Home Location Register (HLR) or Home Subscriber Server (HSS) of the home wireless communications network 120, that is, the HLR/HSS 124, to authenticate subscriber information (not shown) of the user 107. The query 142 may be sent using any entity of the visited wireless communications network 115. For example, the query 142 may be sent using a mobile switching center (MSC) (not shown) or mobile management entity (MME) (not shown) based on the visited wireless communications network 115 being a 3G or 4G network, respectively. It should be understood, however, that the visited wireless communications network 115 is not limited to a 3G or 4G network and that the query 142 may be sent using any entity of the visited wireless communications network 115.

The query 142 is sent to indicate to the HLR/HSS 124 that a subscriber, such as the user 107, is roaming, and a response 144 may indicate whether or not such roaming is allowed. Based on the response 144 to the query 142, the MSC/MME may determine whether such subscriber information is authenticated and invoke the SGSN/S-GW 134 to send the GTP request 106 in an event the subscriber information is authenticated. The SGSN/S-GW 134 may refrain from sending the GTP request 106 in an event the subscriber information is not authenticated. The GTP request 106 may be authenticated, for example, by an MSC (e.g., 3G) or MME (e.g., 4G) of the visited communications network 115. As such, the GTP request 106 is a "valid" GTP request as it was authenticated and data access, such as access to the data 132 of the Internet 136, is provided to the user 107 as a result of the GTP tunnel 114 being established in response to the GTP request 106.

In the communications network 100, there is a fraudster 109 that is also attempting to access data, such as the data 132 of the Internet 136. The fraudster may attempt same by simulating the SGSN/S-GW 134 of the visited communications network 115 and employing an international mobile subscriber identity (IMSI) of the UE 105 causing a subscriber, such as the user 107, to be billed for such data access. The fraudster 109 may or may not be located in the visited wireless communications network 115 and may attempt to use a fraudulent device 121, that may be an SGSN/S-GW or another device configured to send the GTP request 108, that is, a fraudulent GTP request, that is sent to the GGSN/P-GW 103 of the interconnect network 104. In a typical communications network, the fraudster 109 may be successful because a typical interconnect GGSN/P-GW accepts all create session request messages and establishes GTP tunnels absent subscriber level, network level, or user level authentication of such messages.

According to an example embodiment, however, the fraudster 109 is not successful, because the apparatus 102, included in the interconnect network 104, provides data access security in the communications network 100 by blocking the GTP tunnel 112 from being established, and preventing the fraudster 109 from accessing data in the communications network 100, as disclosed below.

According to an example embodiment, the GTP tunnel 112 may be blocked because subscriber level information, such as an international mobile subscriber identity (IMSI) or other information associated with a subscriber, and network level information, such as a public land mobile network (PLMN) identifier or other network level information associated with a network, are checked and not authenticated. An example embodiment not only checks that a subscriber associated with the GTP request is valid and attached to a network identified by the GTP request, but also checks that the subscriber is actually attached to that network at the time that such GTP request is made. An example embodiment may further authenticate user device level information to grant or deny such request by confirming that the IMSI specified in the GTP request indeed belongs to or is loaded on the user device that triggered the GTP request. An example embodiment may detect a fraudster by detecting that a given eSIM deployed on a user device is not expected to be deployed on that user device.

According to an example embodiment, the GTP tunnel 112, that is, the fraudulent GTP tunnel, may be blocked because, while an IMSI specified in the GTP request may be valid, further authentication reveals that the IMSI is not attached to a public land mobile network (PLMN) specified in the GTP request or that the GTP request was not sourced by a device located in the PLMN. According to an example embodiment, the apparatus 102 authenticates that the subscriber is indeed attached to the PLMN and that the device sourcing the GTP request is indeed located in the PLMN, as disclosed below.

The apparatus 102 comprises a processor (not shown). According to an example embodiment, the processor is configured to authenticate a GTP request, such as the GTP request 106, that is a valid GTP request, or the GTP request 108, that is a fraudulent GTP request. The processor is configured to authenticate the GTP request by authenticating GTP request information 110 that includes network and subscriber information from the GTP request received by the GGSN/P-GW 103. The GTP request information 110 is received from the GGSN/P-GW 103 via the communications interface. Such network and subscriber information may be present in information element (IE) fields of a GTP Create Session Request or any other type of GTP-C request for creating a new session. GTP-C messages of various versions may include several information elements (IEs) and it should be understood that the GTP request is not limited to any specific GTP version.

The processor is configured to provide the data access security by preventing access to data 132, otherwise accessed via the interconnect network 104 using the GTP tunnel 112 established for the new session, by blocking the GTP tunnel 112 from being established in an event the GTP request 108, that is, the fraudulent GTP request, cannot be authenticated. To block the GTP tunnel 112 from being established, the processor may be configured to send a first control signal (not shown) as the control signal 143 to the GGSN/P-GW 103 via the communications interface, causing the GGSN/P-GW 103 from establishing the GTP tunnel.

In an event the GTP request is authenticated, the processor enables the GTP tunnel to be established, for example, by sending a second control signal (not shown) as the control signal 143 to the GGSN/P-GW 103 via the communications interface, causing the GGSN/P-GW 103 to establish the GTP tunnel.

The network information may include a PLMN identifier (not shown) and the processor may be further configured to authenticate the network information by confirming that the PLMN identifier is valid. The processor may be further configured to confirm that the PLMN identifier is valid by confirming that the PLMN identifier is present in a list of valid PLMN identifiers 117 included in a Global System of Mobile Communications Association (GSMA) roaming database 116. In an event the PLMN identifier is confirmed to be valid, the processor may be further configured to authenticate the network information by confirming that a source internet protocol (IP) address (not shown) of an outermost header of the GTP request belongs to the PLMN (not shown) identified by the PLMN identifier. The processor may be further configured to confirm that the source IP address belongs to the PLMN based on data stored in a Global System of Mobile Communications Association (GSMA) roaming database 116.

The subscriber information may include an IMSI (not shown). To authenticate the subscriber information, the processor may be further configured to verify that the IMSI is provisioned to be enabled in the interconnect network 104. To verify that the IMSI is provisioned to be enabled in the interconnect network 104, the processor may be further configured to access a database 118 included in the interconnect network 104 to confirm that the IMSI is a) present among a plurality of international mobile subscriber identities (IMSIs) 119 stored in the database 118 and b) associated with an enabled state. According to an example embodiment, the enabled state may be an allowed or in-transit state, whereas a disabled state may be a blocked state.

The database 118 may be referred to as an IMSI, IMEI, integrated circuit card identifier (ICCID), and embedded universal integrated circuit card (eUICC) identifier (ID) inventory database as the database 118 is configured to store an inventory of IMSIs, international mobile equipment identifiers (IMEIs), ICCIDs, and eUICC IDs, as well as any mappings therebetween. For example, the database 118 may include a 1:1 mapping between IMSIs and ICCIDs and many to one mappings between IMSIs and a given eUICC ID. The inventory may be a dynamic inventory that is initially configured, for example, to map respective default IMSIs to ICCIDs and eUICC IDs.

Such a dynamic inventory may be maintained by the apparatus 102, that is, the eSIM manager. The IMSIs stored in the database 118 may be "hosted" by the interconnect network 104 as such IMSIs may not be owned by the interconnect network 104. The apparatus 102 may be referred to interchangeably herein as an eSIM manager because the apparatus 102 may be configured to manage which subscriber profiles are active on eSIMs of user devices, such as a subscriber profile (not shown) of the UE 105. The eSIM manager may map a single IMEI to a given ICCID or eUICC ID or may map multiple IMEIs to the given ICCID or eUICC ID, based on a customer preference.

The interconnect network 104 is communicatively coupled to the home wireless communications network 120. To authenticate the subscriber information, the processor may be further configured to query the home wireless communications network 120 to confirm that the IMSI is attached, presently, to a PLMN associated with the PLMN identifier. The PLMN may be the visited wireless communications network 115 or the home wireless communications network 120. To query the home wireless communications network 120 to confirm that the IMSI is attached, presently, to the PLMN, the processor may be further configured to send a query 122 to a Home Location Register (HLR) or Home Subscriber Server (HSS), that is, the HLR/HSS 124, of the home wireless communications network 120 and receives a response 126. The response 126 confirms whether the IMSI is attached, presently, to the PLMN.

The processor may be further configured to authenticate the GTP request by authenticating user device information of the GTP request and included in the GTP request information 110. The user device information may be received via the communications interface. The user device information may include an international mobile equipment identifier (IMEI) (not shown) that is an optional IE in the GTP request. The processor may be further configured to authenticate the user device information by validating a mapping of the IMEI to the IMSI. To validate the mapping of the IMEI to the IMSI, the processor may be further configured to, optionally, determine whether there is an active GTP session associated with the IMSI and a different IMEI relative to the IMEI of the GTP request. In an event such active GTP session associated with the different IMEI is determined to be active, the processor may be configured to conclude that the mapping of the IMEI to the IMSI is invalid and the connection is rejected/blocked. For example, if there is an active GTP session associated with a given IMSI and given IMEI, a connection will be rejected/blocked if it aims to employ the given IMSI and another IMEI that is not the same as the given IMEI.

To authenticate the user device information, the processor may be further configured to access the database 118 that is included in the interconnect network 104 to determine whether the IMEI is present in the database 118. In an event the IMEI is not present in the database 118, the processor may be further configured to enable the GTP tunnel to be established. In an event the IMEI is present in the database 118, the processor may be further configured to determine whether the IMEI is mapped, in the database 118, to at least one IMSI. In an event the IMEI is not mapped to any IMSI in the database 118, the processor may be further configured to enable the GTP tunnel to be established.

In an event the IMEI is mapped to the at least one IMSI in the database 118, the processor may be further configured to determine whether the IMEI matches an ICCID (not shown) or eUICC ID (not shown) that is mapped, in the database 118, to the IMSI included in the subscriber information of the GTP request.

In an event the GTP request is authenticated, the processor may be further configured to enable the GTP tunnel to be established, determine whether data traffic statistics (not shown), associated with user data (not shown) transported over the GTP tunnel established and monitored over a time period, violate a traffic profile (not shown) that is associated with a given ICCID or given eUICC ID, wherein the given ICCID or eUICC ID mapped to the IMEI in a database 118 of the interconnect network 104. According to an example embodiment, the traffic profile may be a "quota" that is across a device, IMSI, or eUICC ID and violation of the traffic profile may be detected by detecting deviation of an amount from the quota or a historical utilization.

The traffic profile may be useful for identifying fraudulent activity because it may reflect an expected amount of data activity. For a low power device such an expected amount of activity may be less than that utilized by the fraudster 109. As such, the fraudster 109 may violate such a traffic profile and, while the GTP tunnel 112 may have been established, such monitoring may be useful to detect the fraudulent activity after the GTP tunnel, that is, the fraudulent tunnel, has been established.

For example, in an event the data traffic statistics violate the traffic profile, the processor may be further configured to (i) activate an alarm (not shown) associated with the GTP tunnel established, (ii) delete the GTP tunnel established, (iii) throttle a data speed of data (not shown) being transported over the GTP tunnel established, or (iv) a combination thereof.

To determine whether the data traffic statistics violate the traffic profile associated with the given ICCID or eUICC ID, the processor may be further configured to retrieve at least one call detail record (CDR) 128 associated with the given ICCID or eUICC ID from a call data record (CDR) database 130 of the interconnect network 104 and generate the data traffic statistics from the at least one CDR 128 retrieved.

Figure 2A:
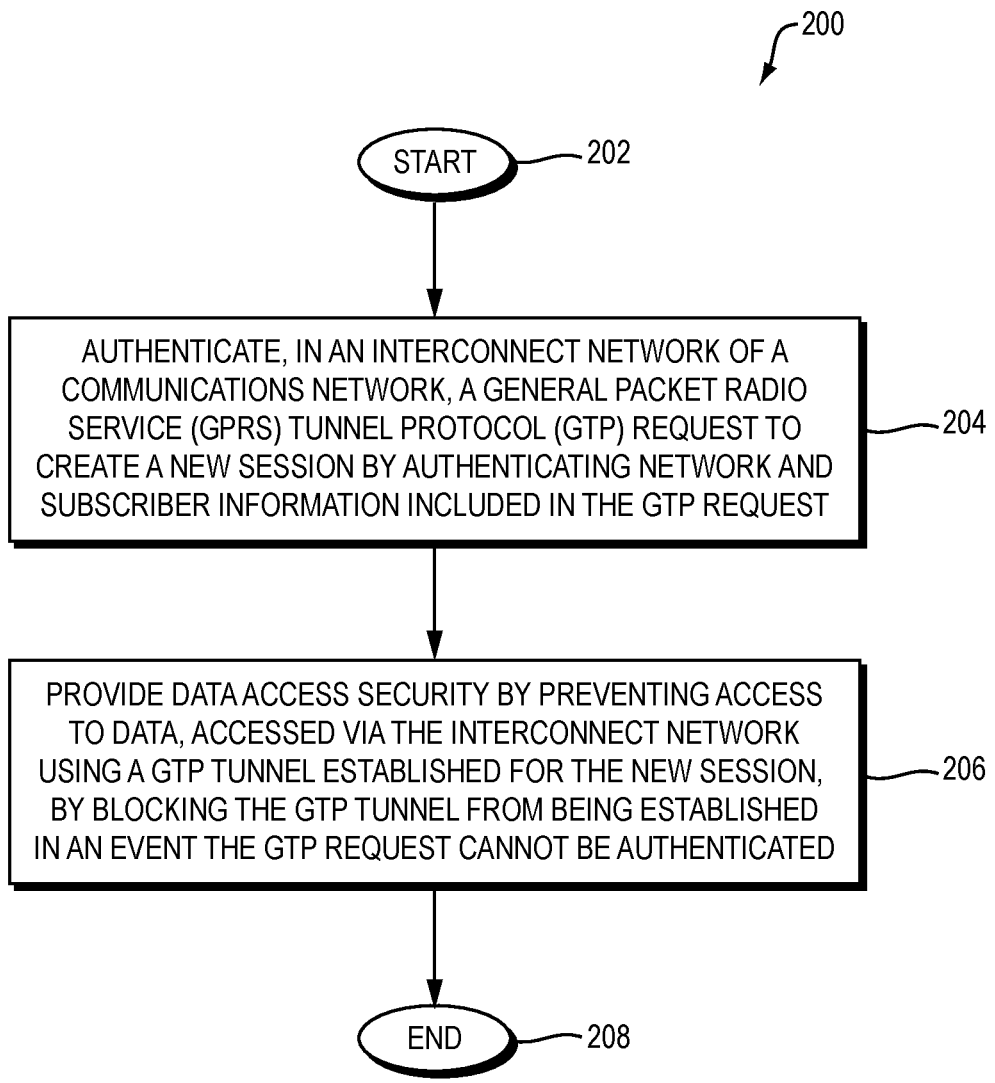
FIG. 2A is a flow diagram of an example embodiment of a method for providing data access security in a communications network.

FIG. 2A is a flow diagram 200 of an example embodiment of a method for providing data access security in a communications network, such as the communications network 100 of FIG. 1, disclosed above. The method begins (202), and authenticates, in an interconnect network of the communications network, a general packet radio service (GPRS) tunnel protocol (GTP) request to create a new session, the authenticating including authenticating network and subscriber information included in the GTP request (204). The method provides the data access security by preventing access to data, accessed via the interconnect network using a GTP tunnel established for the new session, by blocking the GTP tunnel from being established in an event the GTP request cannot be authenticated (206), and the method thereafter ends (208) in the example embodiment.

Figure 2B:
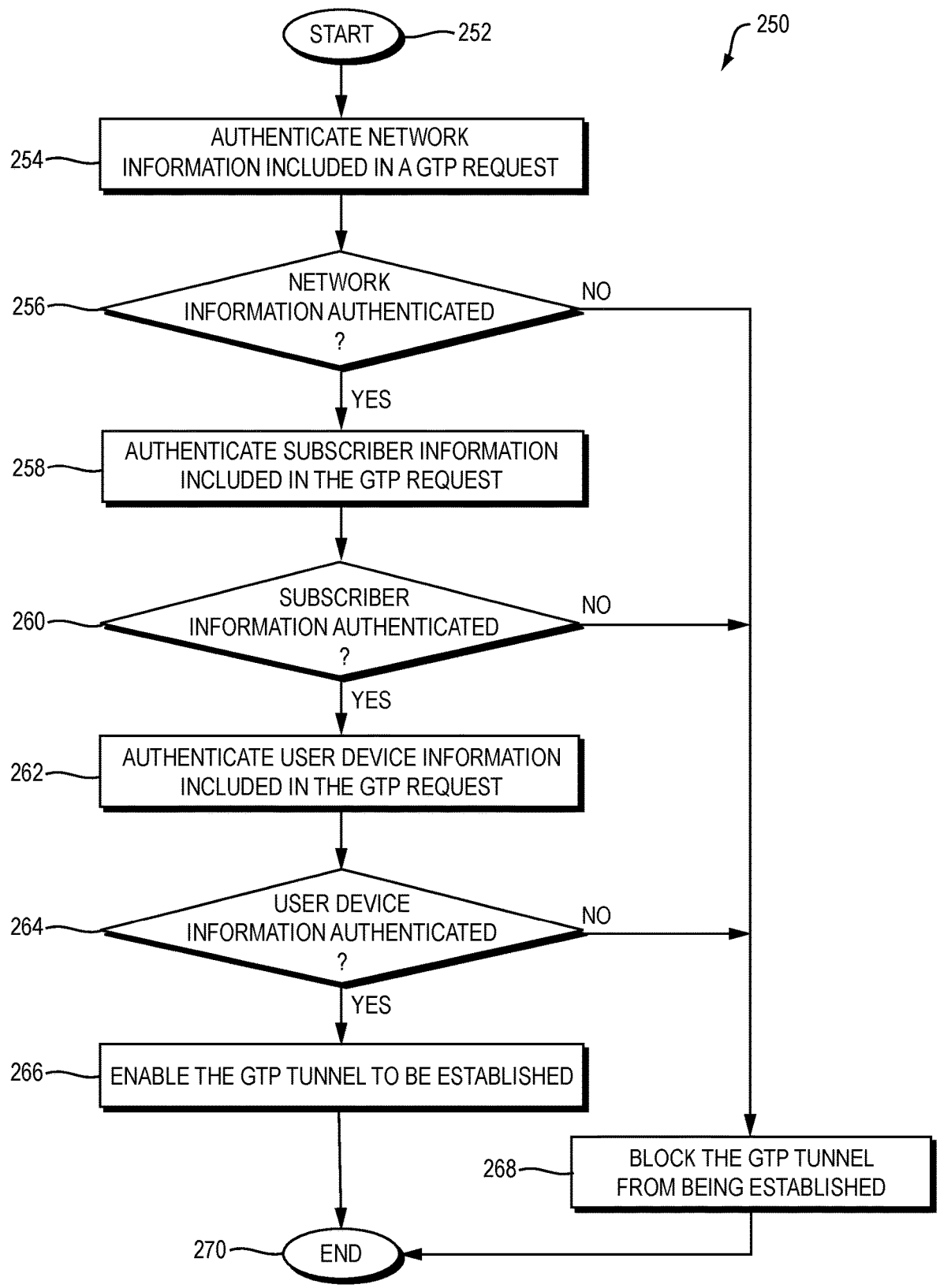
FIG. 2B is a flow diagram of another example embodiment of a method for providing data access security in a communications network.

FIG. 2B is a flow diagram 250 of another example embodiment of a method for providing data access security in a communications network, such as the communications network 100 of FIG. 1, disclosed above. The method begins (252) and authenticates, in an interconnect network of the communications network, network information included in a general packet radio service (GPRS) tunnel protocol (GTP) request to create a new session (254). The method checks for whether the network information is authenticated (256) and, if not, blocks a GTP tunnel from being established (268) and the method thereafter ends (270), in the example embodiment.

If, however, it is determined at (256) that the network information is authenticated, the method proceeds to authenticate subscriber information included in the GTP request (258). The method checks for whether the subscriber information is authenticated (260) and, if not, blocks the GTP tunnel from being established (268) and the method thereafter ends (270), in the example embodiment.

If, however, it is determined at (260) that the subscriber information is authenticated, the method proceeds to authenticate user device information included in the GTP request (262). The method checks for whether the user device information is authenticated (264) and, if not, blocks the GTP tunnel from being established (268) and the method thereafter ends (270), in the example embodiment. If, however, it is determined at (264) that the user device information is authenticated, the method proceeds to enable the GTP tunnel to be established (266) and the method thereafter ends (270), in the example embodiment.

Figure 3A:
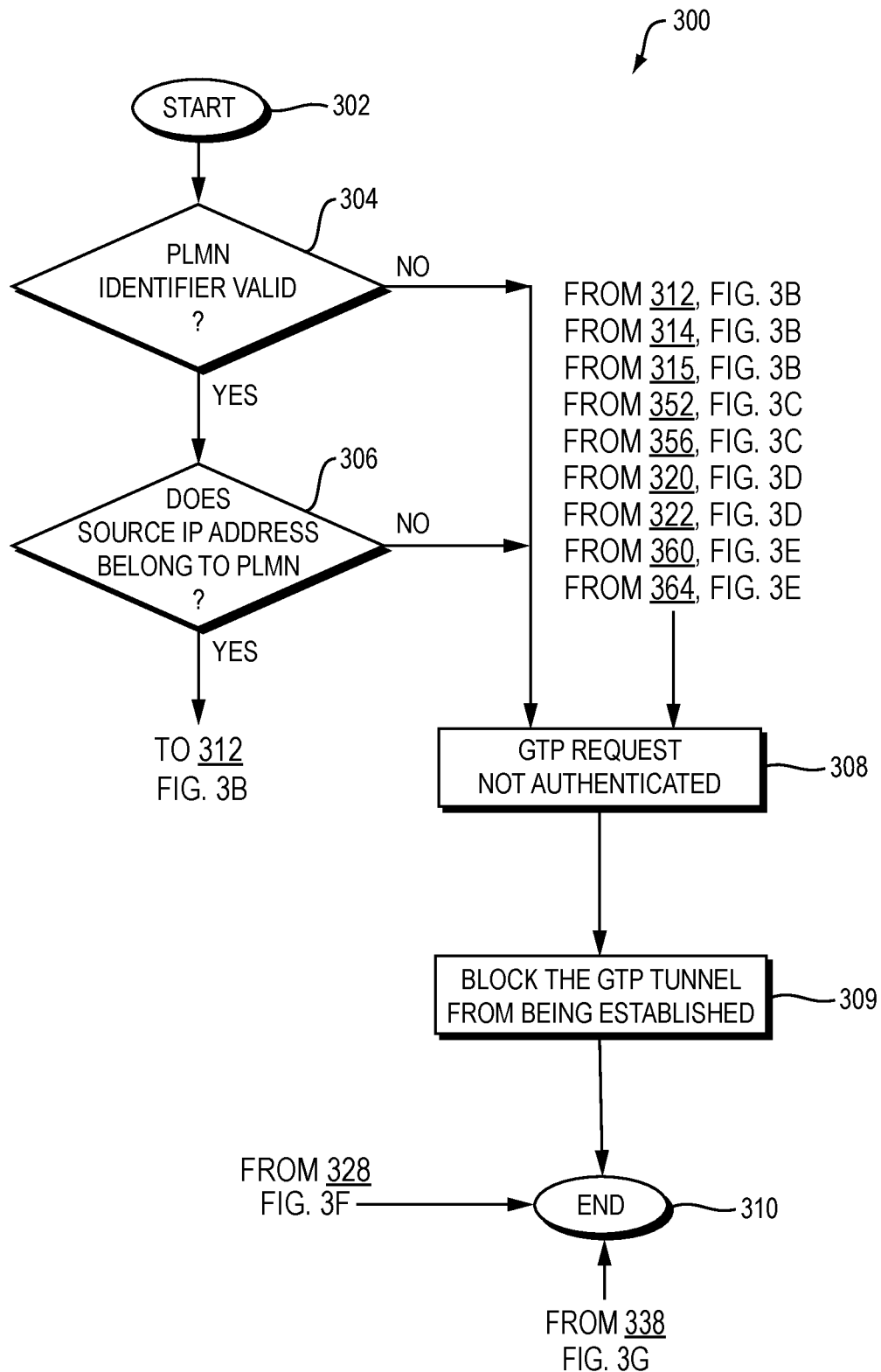
FIG. 3A is a flow diagram of yet another example embodiment of a method for providing data access security in a communications network.

FIG. 3A is a flow diagram 300 of yet another example embodiment of a method for providing data access security in a communications network, such as the communications network 100 of FIG. 1, disclosed above. The method begins (302) and authenticates, in an interconnect network of a communications network, a general packet radio service (GPRS) tunnel protocol (GTP) request to create a new session. The authenticating includes authenticating network and subscriber information included in the GTP request. The network information includes a public land mobile network (PLMN) identifier and to authenticate the network information, the method confirms that the PLMN identifier is valid (304). In an event the PLMN identifier is not confirmed to be valid, the GTP request is not authenticated (308), the method blocks a GTP tunnel from being established (309), and the method thereafter ends (310) in the example embodiment.

If, however, the PLMN identifier is confirmed to be valid, the method confirms that a source internet protocol (IP) address of an outermost header of the GTP request belongs to a PLMN identified by the PLMN identifier (306). If the source IP address is not confirmed to belong to the PLMN identified by the PLMN identifier, the GTP request is not authenticated (308), the method blocks the GTP tunnel from being established (309), and the method thereafter ends (310) in the example embodiment. If, however, the source IP address is confirmed to belong to the PLMN identified by the PLMN identifier, the method continues and verifies subscriber information included in the GTP request, as disclosed below with regard to FIG. 3B.

Figure 3B:
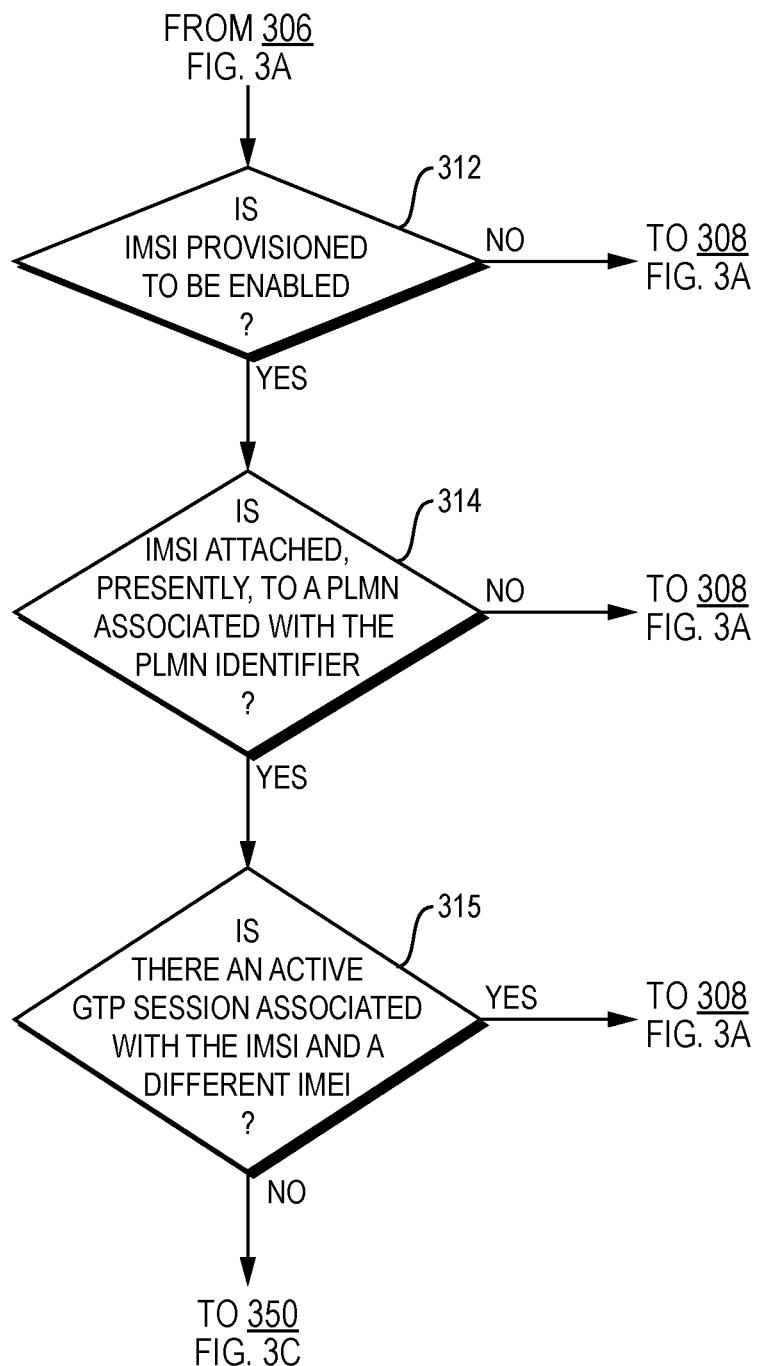
FIG. 3B is a continuation of the flow diagram of FIG. 3A.

FIG. 3B is a continuation of the flow diagram of FIG. 3A. As disclosed in FIG. 3B, the method verifies whether an international mobile subscriber identity (IMSI), included in the subscriber information of the GTP request, is provisioned to be enabled in the interconnect network (312). If the IMSI is not provisioned to be enabled, the GTP request is not authenticated (308), the method blocks the GTP tunnel from being established (309), and the method thereafter ends (310) in the example embodiment, as disclosed above with regard to FIG. 3A.

If, however, the IMSI is provisioned to be enabled, the method continues and checks for whether the IMSI is attached, presently, to a PLMN associated with the PLMN identifier of the GTP request (314). If not, the GTP request is not authenticated (308), the method blocks a GTP tunnel from being established (309), and the method thereafter ends (310) in the example embodiment, as disclosed above with regard to FIG. 3A.

If, however, it is determined that the IMSI is attached, presently, to the PLMN associated with the PLMN identifier, the method proceeds and determines whether there is an active GTP session associated with the IMSI and a different IMSI relative to the IMSI of the GTP request (315). In an event there is such an active GTP session associated with the different IMSI, the method concludes that a mapping of the IMSI to the IMSI is invalid and, as such, the GTP request is not authenticated (308), the method blocks a GTP tunnel from being established (309), and the method thereafter ends (310) in the example embodiment, as disclosed above with regard to FIG. 3A. If, however, there is no such GTP session, the method accesses a database, included in the interconnect network, and proceeds to check whether the IMSI is mapped to a radio access type (RAT) in the database (350), as disclosed below with regard to FIG. 3C.

Figure 3C:
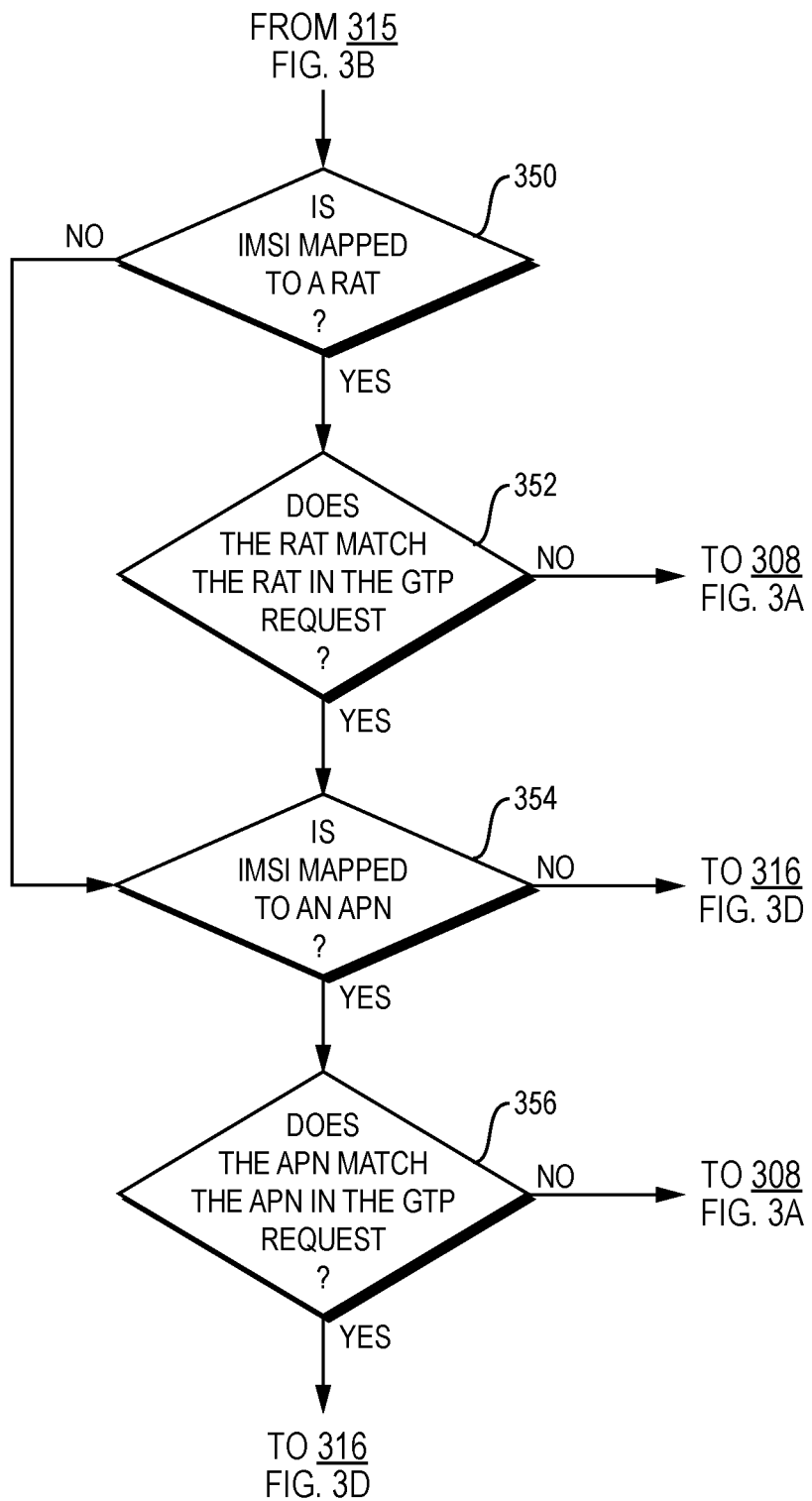
FIG. 3C is a continuation of the flow diagram of FIG. 3B.

FIG. 3C is a continuation of the flow diagram of FIG. 3B. As disclosed in FIG. 3C, the method checks whether the IMSI is mapped to a RAT in the database (350). The RAT may be 3G, 4G, narrowband-Internet of Things NB-IoT, or other radio type. If the IMSI is not mapped to a RAT in the database, the method may proceed to check whether the IMSI is mapped to an access point name (APN) in the database (354), as disclosed further below. If, however, the IMSI is mapped to a RAT in the database, the method proceeds to check whether the RAT matches a given RAT in the GTP request (352). If the RAT mapped to the IMSI in the database and the given RAT from the GTP request do not match, the GTP request is not authenticated (308), the method blocks a GTP tunnel from being established (309), and the method thereafter ends (310) in the example embodiment, as disclosed above with regard to FIG. 3A.

If, however, the RAT mapped to the IMSI in the database and the given RAT from the GTP request do match, the method may proceed to check whether the IMSI is mapped to an APN in the database (354). If not, the method may proceed to access the database and determine whether the IMEI is present in the database (316), as disclosed further below with regard to FIG. 3D. If, however, the IMSI is mapped to an APN in the database, the method proceeds to check whether the APN matches a given APN in the GTP request (356). If the APN mapped to the IMSI in the database and the given APN from the GTP request do not match, the GTP request is not authenticated (308), the method blocks a GTP tunnel from being established (309), and the method thereafter ends (310) in the example embodiment, as disclosed above with regard to FIG. 3A. If, however, the APN mapped to the IMSI in the database and the given APN from the GTP request do match, the method may proceed to access the database and determine whether the IMEI is present in the database (316), as disclosed below with regard to FIG. 3D.

Figure 3D:
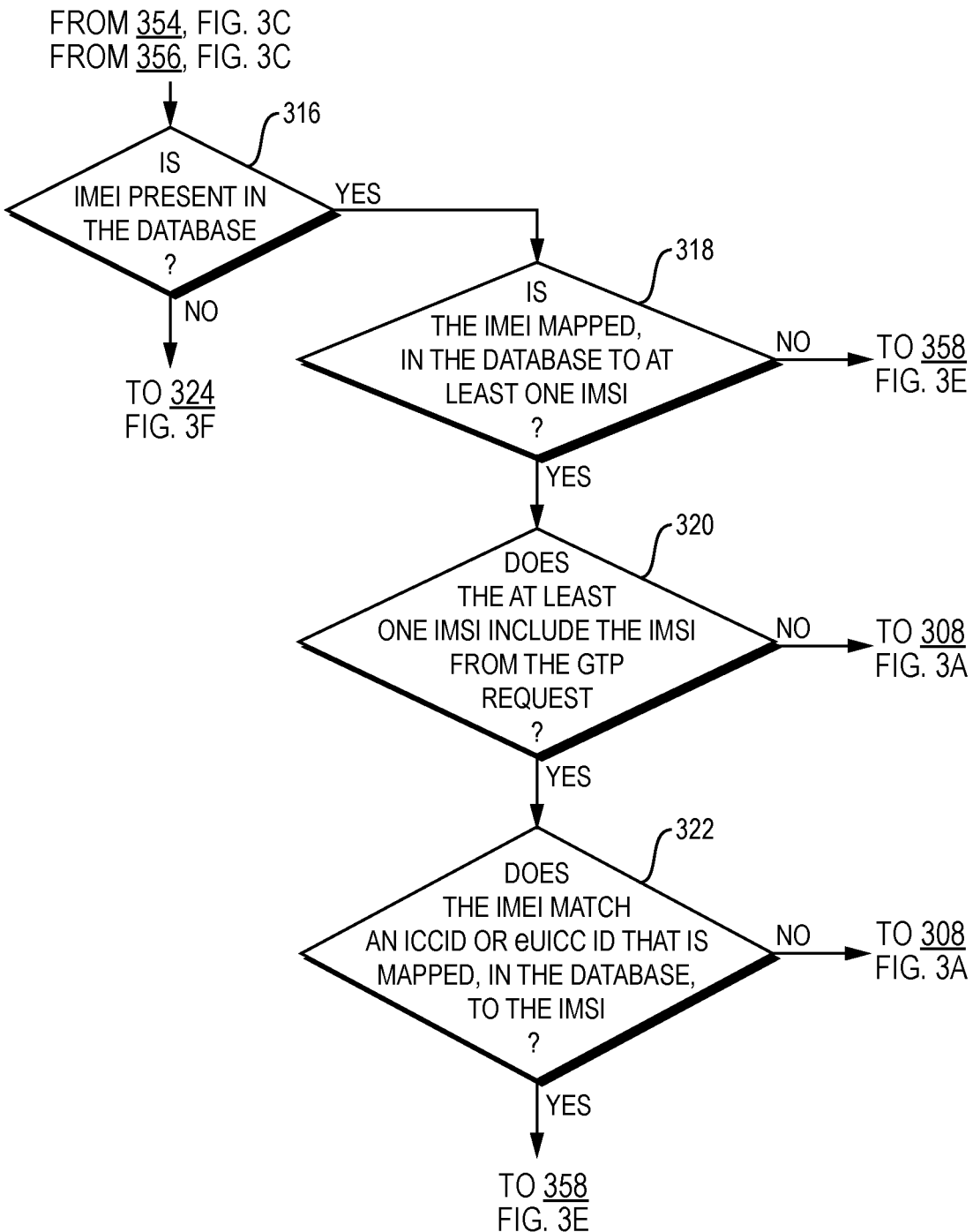
FIG. 3D is a continuation of the flow diagram of FIG. 3C.

FIG. 3D is a continuation of the flow diagram of FIG. 3C. As disclosed in FIG. 3D, the method accesses the database, included in the interconnect network, and determines whether the IMEI is present in the database (316). In an event the IMEI is not present in the database, the method proceeds to authenticate the GTP request (324) and enable the GTP tunnel to be established (326), as disclosed further below with regard to FIG. 3F. If, however, the IMEI is determined to be present in the database, the method proceeds to determine whether the IMEI is mapped, in the database, to at least one IMSI (318). If not, the method proceeds to check whether the IMEI matches an integrated circuit card identifier (ICCID) or embedded universal integrated circuit card (eUICC) identifier (ID) that is mapped, in the database, to a RAT (358), as disclosed further below with regard to FIG. 3E. If, however, the IMEI is mapped in the database to at least one IMSI, the method proceeds as in FIG. 3D and checks for whether the at least one IMSI includes the IMSI from the GTP request (320). If not, the GTP request is not authenticated (308), the method blocks a GTP tunnel from being established (309), and the method thereafter ends (310) in the example embodiment, as disclosed above with regard to FIG. 3A.

If, however, the at least one IMSI does include the IMSI from the GTP request, the method determines whether the IMEI matches an ICCID or an eUICC ID that is mapped, in the database, to the IMSI of the GTP request (322). If the IMEI does not match, the GTP request is not authenticated (308), the method blocks a GTP tunnel from being established (309), and the method thereafter ends (310) in the example embodiment, as disclosed above with regard to FIG. 3A. If, however, the IMEI does match, the method continues and proceeds to check whether the IMEI matches an ICCID or eUICC ID that is mapped, in the database, to a RAT (358), as disclosed further below with regard to FIG. 3E.

Figure 3E:
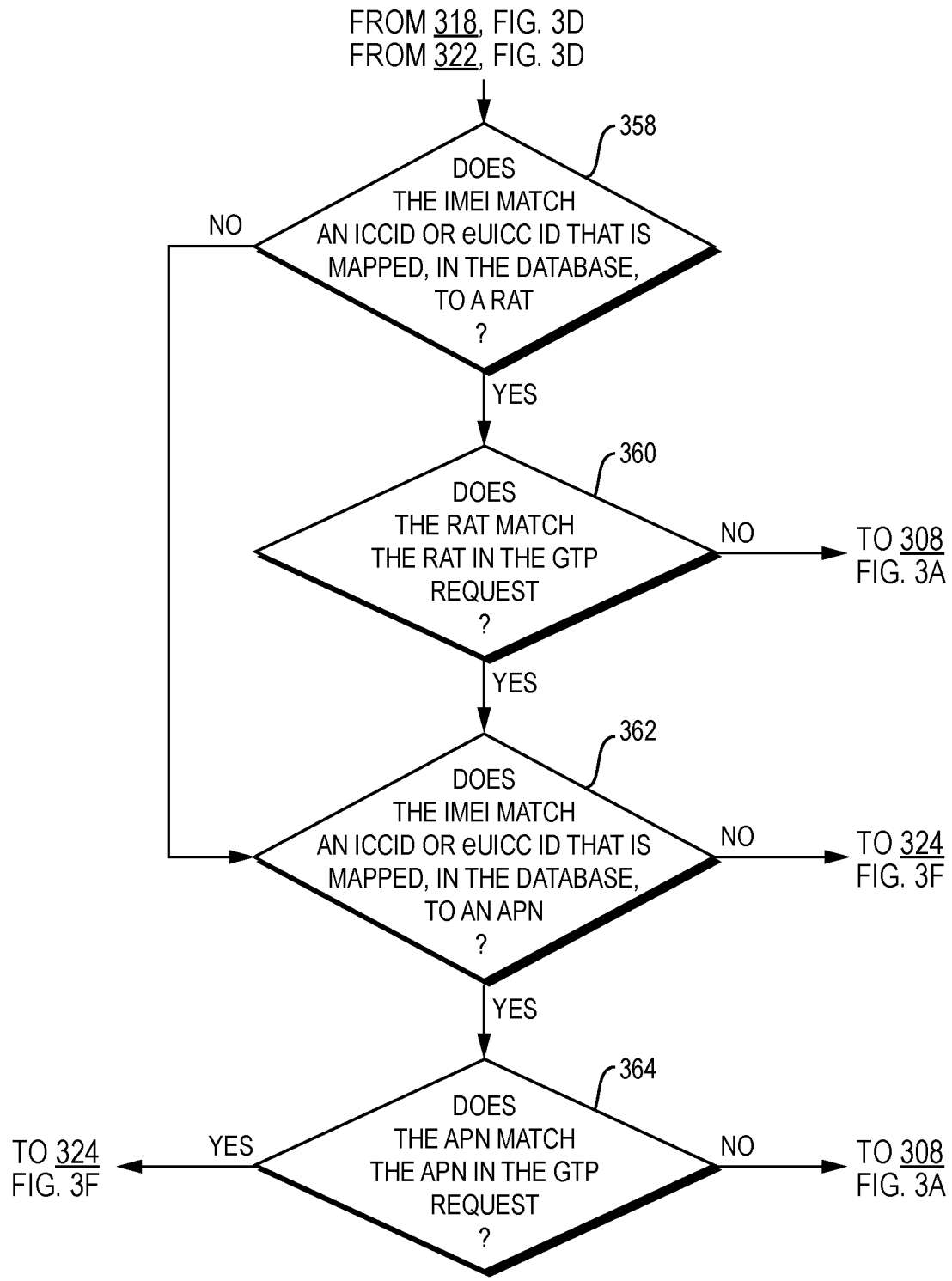
FIG. 3E is a continuation of the flow diagram of FIG. 3D.

FIG. 3E is a continuation of the flow diagram of FIG. 3D. As disclosed in FIG. 3E, the method checks whether the IMEI matches an ICCID or eUICC ID that is mapped, in the database, to a RAT (358). If not, the method checks whether the IMEI matches an ICCID or eUICC ID that is mapped, in the database, to an APN (362), as disclosed further below. If, however, the IMEI does match an ICCID or eUICC ID that is mapped, in the database, to a RAT, the method proceeds to check whether the RAT matches a given RAT from the GTP request (360). If not, the GTP request is not authenticated (308), the method blocks a GTP tunnel from being established (309), and the method thereafter ends (310) in the example embodiment, as disclosed above with regard to FIG. 3A.

If, however, the RAT does match the given RAT from the GTP request, the method proceeds and checks whether the IMEI matches an ICCID or eUICC ID that is mapped, in the database, to an APN (362). If not, the method proceeds to authenticate the GTP request (324) and enable the GTP tunnel to be established (326), as disclosed below with regard to FIG. 3F. If, however the IMEI does match an ICCID or eUICC ID that is mapped to an APN, the method checks with the APN matches a given APN from the GTP request (364). If not, the GTP request is not authenticated (308), the method blocks a GTP tunnel from being established (309), and the method thereafter ends (310) in the example embodiment, as disclosed above with regard to FIG. 3A. If, however, the APN does match the given APN from the GTP request, the method proceeds to authenticate the GTP request (324) and enable the GTP tunnel to be established (326), as disclosed below with regard to FIG. 3F.

Figure 3F:
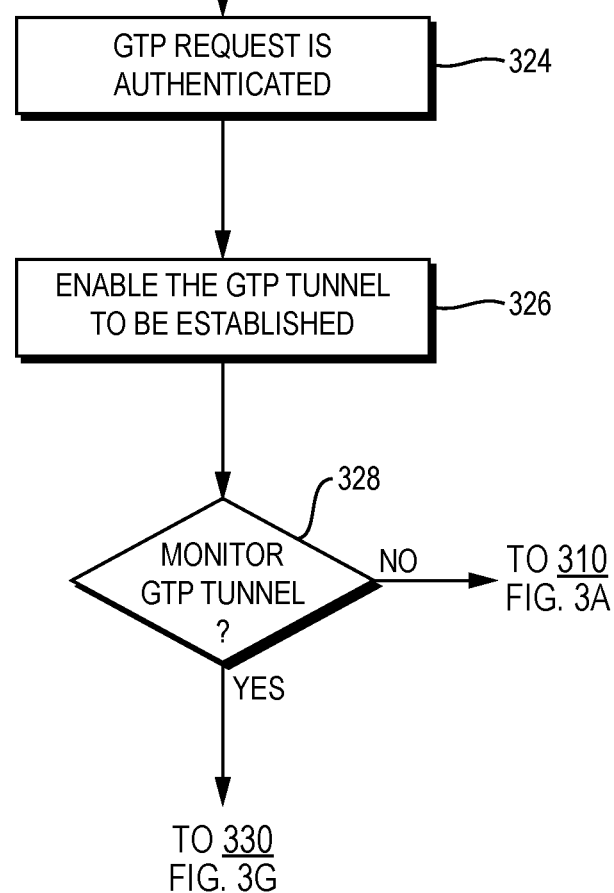
FIG. 3F is a continuation of the flow diagram of FIG. 3E.

FIG. 3F is a continuation of the flow diagram of FIG. 3E. As disclosed in FIG. 3F, the method authenticates the GTP request (324), enables the GTP tunnel to be established (326), and checks for whether to monitor the GTP tunnel (328). If the GTP tunnel is not to be monitored, the method ends (310) in the example embodiment, as disclosed in FIG. 3A. If, however, the GTP tunnel is to be monitored, the method proceeds as disclosed below with regard to FIG. 3G.

Figure 3G:
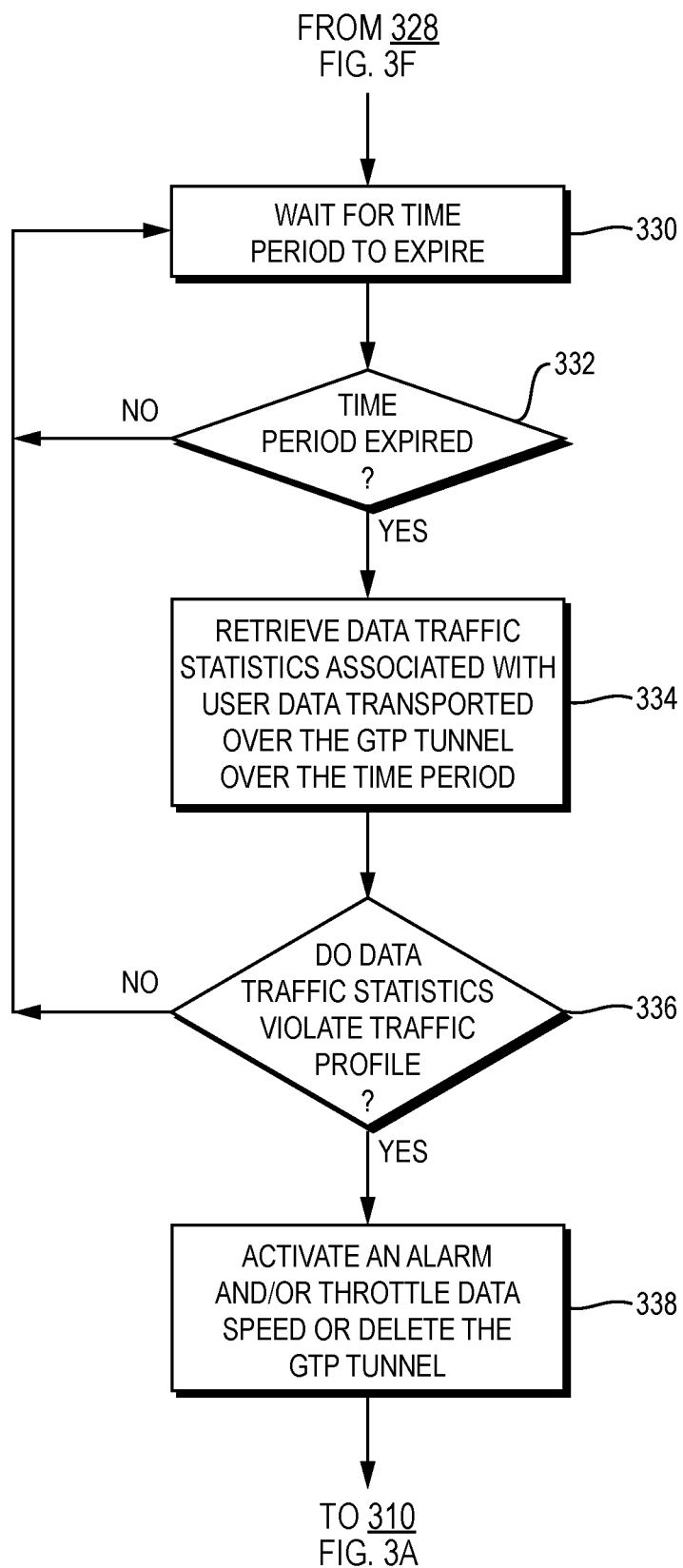
FIG. 3G is a continuation of the flow diagram of FIG. 3F.

FIG. 3G is a continuation of the flow diagram of FIG. 3F. As disclosed in FIG. 3G, the method monitors the GTP tunnel and such monitoring includes waiting for a time period, during which data traffic statistics, associated with user data transported over the GTP tunnel are monitored, has expired (330). The method checks for whether the time period has expired (332). If not, the method continues to monitor the data traffic statistics and wait for the time period to expire (330).

If, however, the time period has expired, the method retrieves data traffic statistics, also referred to as utilization, that is associated with user data transported over the GTP tunnel established and monitored over the time period (334) and checks whether the data traffic statistics violate a traffic profile associated with a given ICCID or given eUICC ID, wherein the given ICCID or eUICC ID is mapped to the IMEI in the database of the interconnect network (336). According to an example embodiment, determining whether the data traffic statistics violate the traffic profile associated with the given ICCID or eUICC ID may include retrieving call detail records (CDRs) associated with the given ICCID or eUICC ID from a database included in the interconnect network and generating the data traffic statistics from the CDRs retrieved.

According to an example embodiment, the utilization associated with an IMEI to IMSI mapping can be built, dynamically, based on historical data. While an IMEI to IMSI mapping may not be present in the database, utilization associated with the IMEI may still be tracked if the IMEI is present in the database. If, however, the IMEI is not present in the database, then utilization may be tracked based on the IMSI and ICCID or eUICC ID.

Referring back to FIG. 3, if at (336) it is determined that the data traffic statistics do not violate the traffic profile, the method continues to monitor the GTP tunnel and wait for the time period to expire (330). If, however, it is determined that the data traffic statistics do violate the traffic profile, the method (i) activates an alarm associated with the GTP tunnel established, (ii) deletes the GTP tunnel established, (iii) throttles a data speed of data being transported over the GTP tunnel established, or performs a combination thereof, and the method thereafter ends (310), as disclosed above with regard to FIG. 3A.

Figure 4:
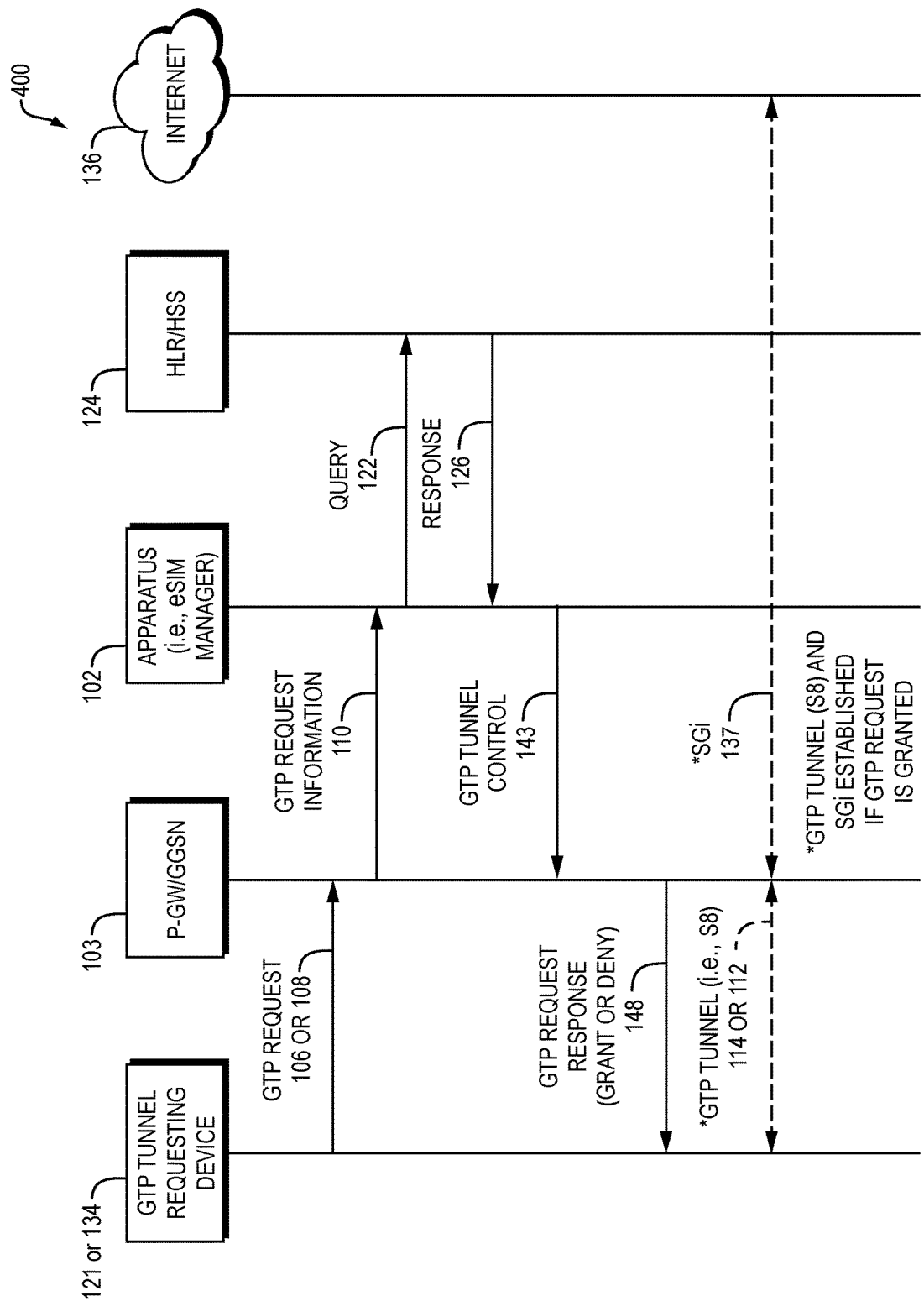
FIG. 4 is a signaling diagram of an example embodiment of signaling for providing data access security in a communications network.

FIG. 4 is a signaling diagram 400 of an example embodiment of signaling for providing data access security in a communications network, such as the communications network 100 of FIG. 1, disclosed above. In the signaling diagram 400, the GGSN/P-GW 103 receives the GTP request 106 or 108 for a new session from a GTP tunnel requesting device, that this, the UE 105 or fraudulent device 121 of FIG. 1, disclosed above. In response to receiving the GTP request 106 or 108, the GGSN/P-GW 103 extracts GTP request information 110 from the GTP request 106 or 108 and transmits same to the apparatus 102, that is, the eSIM manager of FIG. 1, disclosed above. The GTP request information 110 includes network and subscriber information included in information elements of the GTP request 106 or 108. The apparatus 102 validates the network information based on information stored in the GSMA roaming database 116 and the database 118 of the interconnect network 104 and sends the query 122 to the HLR/HSS 124 to authenticate the subscriber information.

The apparatus 102 receives the response 126 from the HLR/HSS 124 in response to the query 126. The apparatus 102 sends a GTP tunnel control signal 143 to the GGSN/P-GW 103 based on the response 126 and whether or not the network information was validated. For example, if the response 126 indicates that the subscriber information was not validated, the apparatus sends the GTP tunnel control 143 configured to cause the GGSN/P-GW to send the GTP request response 148 to the GTP tunnel requesting device 121 or 134 with an indication that the GTP request 106 or 108 is denied and as such, the P-GW 103 does not establish the GTP tunnel 114 or 112, respectively.

If, however, the apparatus 102 validates the network information and the response 126 indicates that the subscriber information was validated, the apparatus sends the GTP tunnel control 143 configured to cause the GGSN/P-GW to send the GTP request response 148 to the GTP tunnel requesting device 121 or 134 with an indication that the GTP request 106 or 108 is granted. As such, the P-GW 103 establishes the GTP tunnel 114 or 112, respectively, as well as the SGi communications link 137 to the Internet 136, thereby enabling the GTP tunnel requesting device 121 or 134, respectively, to access data of the Internet 136.

Figure 5:
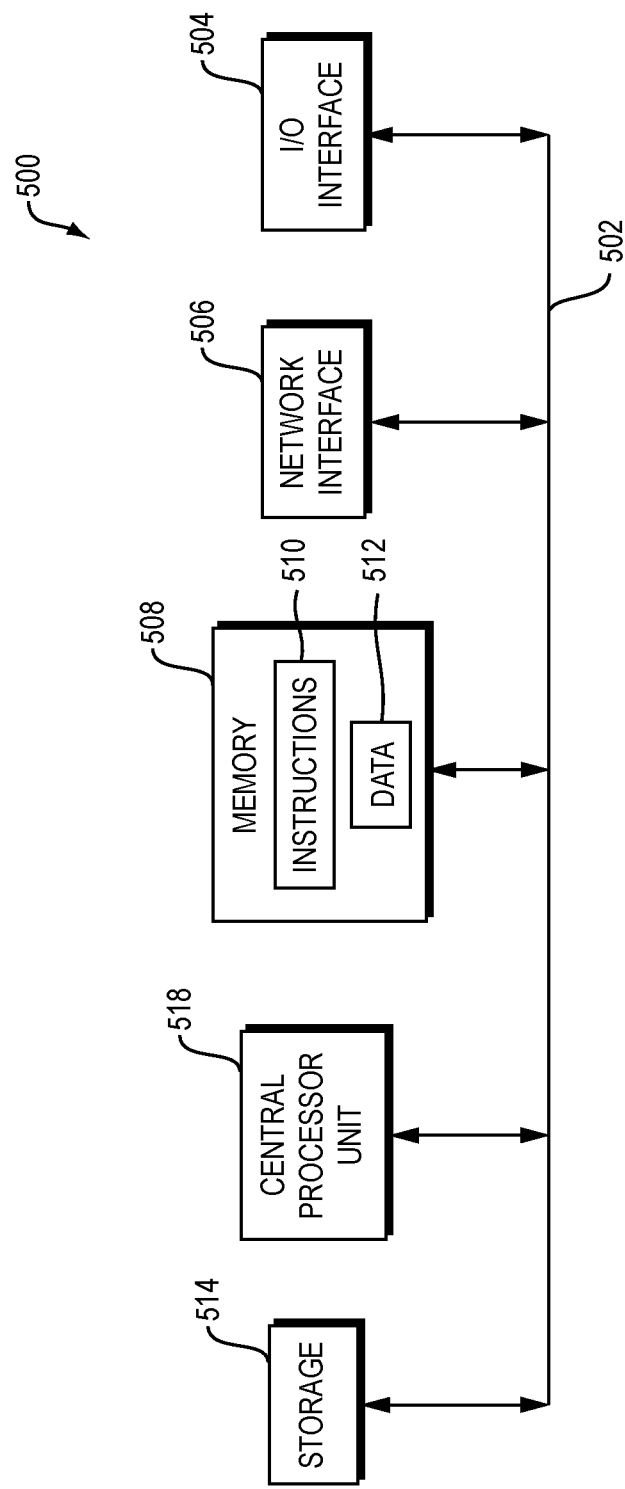
FIG. 5 is a block diagram of an example internal structure of a computer optionally within an embodiment disclosed herein.

FIG. 5 is a block diagram of an example of the internal structure of a computer 500 in which various embodiments of the present disclosure may be implemented. The computer 500 contains a system bus 502, where a bus is a set of hardware lines used for data transfer. The system bus 502 is essentially a shared conduit that connects different elements of a computer system (e.g., processor, disk storage, memory, input/output ports, network ports, etc.) that enables the transfer of information between the elements. Coupled to the system bus 502 is an I/O interface 504 for connecting various I/O devices (e.g., camera, microphone, keyboard, mouse, displays, printers, speakers, etc.) to the computer 500. A network interface 506 allows the computer 500 to connect to various other devices attached to a network. The network interface 506 may be employed as the communications interface of the apparatus 102, disclosed above with regard to FIG. 1. Memory 508 provides volatile or non-volatile storage for computer software instructions 510 and data 512 that may be used to implement an example embodiment of the present disclosure, where the volatile and non-volatile memories are examples of non-transitory media. Disk storage 514 provides non-volatile storage for computer software instructions 510 and data 512 that may be used to implement embodiments of the present disclosure. A central processor unit 518 is also coupled to the system bus 502 and provides for the execution of computer instructions. The computer software instructions 510 may cause the central processor unit 518 to implement methods disclosed herein. The central processor unit 518 may be employed as the processor of the apparatus 102 of FIG. 1, disclosed above.

Further example embodiments disclosed herein may be configured using a computer program product; for example, controls may be programmed in software for implementing example embodiments. Further example embodiments may include a non-transitory computer-readable medium containing instructions that may be executed by a processor, and, when loaded and executed, cause the processor to complete methods described herein. It should be understood that elements of the block and flow diagrams may be implemented in software or hardware, such as via one or more arrangements of circuitry of FIG. 5, disclosed above, or equivalents thereof, firmware, a combination thereof, or other similar implementation determined in the future.

In addition, the elements of the block and flow diagrams described herein may be combined or divided in any manner in software, hardware, or firmware. If implemented in software, the software may be written in any language that can support the example embodiments disclosed herein. The software may be stored in any form of computer readable medium, such as random access memory (RAM), read only memory (ROM), compact disk read-only memory (CD-ROM), and so forth. In operation, a general purpose or application-specific processor or processing core loads and executes software in a manner well understood in the art. It should be understood further that the block and flow diagrams may include more or fewer elements, be arranged or oriented differently, or be represented differently. It should be understood that implementation may dictate the block, flow, and/or network diagrams and the number of block and flow diagrams illustrating the execution of embodiments disclosed herein.

While example embodiments have been particularly shown and described, it will be understood by those skilled in the art that various changes in form and details may be made therein without departing from the scope of the embodiments encompassed by the appended claims.

What is claimed is:

1. An apparatus for providing data access security in a communications network, the apparatus included in an interconnect network of the communications network, the apparatus comprising:
   a communications interface; and
   a processor configured to authenticate a general packet radio service (GPRS) tunnel protocol (GTP) request to create a new session by authenticating network and subscriber information included in the GTP request, the network and subscriber information received via the communications interface, the processor further configured to provide the data access security by preventing access to data, accessed via the interconnect network using a GTP tunnel established for the new session, by blocking the GTP tunnel from being established in an event the GTP request cannot be authenticated;
   wherein the interconnect network is a GPRS roaming exchange (GRX) network or an internet protocol (IP) exchange (IPX) network.

2. The apparatus of claim 1, wherein, in an event the GTP request is authenticated, the processor is further configured to enable the GTP tunnel to be established.

3. The apparatus of claim 1, wherein the network information includes a public land mobile network (PLMN) identifier and wherein the processor is further configured to authenticate the network information by confirming that the PLMN identifier is valid.

4. The apparatus of claim 3, wherein the processor is further configured to confirm that the PLMN identifier is valid by confirming that the PLMN identifier is present in a list of valid PLMN identifiers included in a Global System of Mobile Communications Association (GSMA) roaming database.

5. The apparatus of claim 4, wherein, in an event the PLMN identifier is confirmed to be valid, the processor is further configured to authenticate the network information by confirming that a source internet protocol (IP) address of an outermost header of the GTP request belongs to a PLMN identified by the PLMN identifier.

6. The apparatus of claim 5, wherein the processor is further configured to confirm that the source IP address belongs to the PLMN based on data stored in a Global System of Mobile Communications Association (GSMA) roaming database.

7. The apparatus of claim 1, wherein the subscriber information includes an international mobile subscriber identity (IMSI) and wherein, to authenticate the subscriber information, the processor is further configured to verify that the IMSI is provisioned to be enabled in the interconnect network.

8. The apparatus of claim 7, wherein, to verify that the IMSI is provisioned to be enabled in the interconnect network, the processor is further configured to access a database included in the interconnect network to confirm that the IMSI is a) present among a plurality of international mobile subscriber identities (IMSIs) stored in the database and b) associated with an enabled state.

9. The apparatus of claim 7, wherein the interconnect network is communicatively coupled to a home wireless communications network, wherein the network information includes a PLMN identifier and wherein, to authenticate the subscriber information, the processor is further configured to query the home wireless communications network to confirm that the IMSI is attached, presently, to a PLMN associated with the PLMN identifier.

10. The apparatus of claim 9, wherein, to query the home wireless communications network to confirm that the IMSI is attached, presently, to the PLMN, the processor is further configured to query a Home Location Register (HLR) or Home Subscriber Server (HSS) of the home wireless communications network.

11. The apparatus of claim 1, wherein the processor is further configured to authenticate the GTP request by authenticating user device information included in the GTP request, the user device information received via the communications interface.

12. The apparatus of claim 11, wherein the subscriber information includes an IMSI, wherein the user device information includes an international mobile equipment identifier (IMEI), and wherein the processor is further configured to authenticate the user device information by validating a mapping of the IMEI to the IMSI.

13. The apparatus of claim 12, wherein, to validate the mapping of the IMEI to the IMSI, the processor is further configured to:
determine whether there is an active GTP session associated with the IMSI and a different IMEI relative to the IMEI of the GTP request; and
in an event such active GTP session associated with the different IMEI is determined to be active, conclude that the mapping of the IMEI to the IMSI is invalid.

14. The apparatus of claim 11, wherein the user device information includes an IMEI and wherein, to authenticate the user device information, the processor is further configured to:
access a database included in the interconnect network to determine whether the IMEI is present in the database; and
in an event the IMEI is not present in the database, enable the GTP tunnel to be established.

15. The apparatus of claim 14, wherein, in an event the IMEI is present in the database, the processor is further configured to:
determine whether the IMEI is mapped, in the database, to at least one IMSI; and
in an event the IMEI is not mapped to any IMSI in the database, enable the GTP tunnel to be established.

16. The apparatus of claim 15, wherein the subscriber information includes an IMSI and wherein, in an event the IMEI is mapped to the at least one IMSI in the database, the processor is further configured to:
determine whether the IMEI matches an integrated circuit card identifier (ICCID) or an embedded universal integrated circuit card (eUICC) identifier (ID) that is mapped, in the database, to the IMSI included in the subscriber information of the GTP request;
wherein, in an event (i) the IMEI does match the ICCID or eUICC ID and (ii) the ICCID or eUICC ID is mapped to a radio access type (RAT) in the database, the processor is further configured to determine whether the RAT matches a given RAT included in the GTP request; and
wherein, in an event (iii) the IMEI does match the ICCID or eUICC ID and (iv) the ICCID or eUICC ID is mapped to an access point name (APN) in the database, the processor is further configured to determine whether the APN matches a given APN included in the GTP request.

17. The apparatus of claim 1, wherein the subscriber information includes an IMSI and wherein the processor is further configured to:
authenticate the GTP request by accessing a database included in the interconnect network to determine whether the IMSI is mapped to a RAT or APN;
wherein, in an event the IMSI is mapped to the RAT, the processor is further configured to determine whether the RAT matches a given RAT included in the GTP request; and
wherein, in an event the IMSI is mapped to the APN, the processor is further configured to determine whether the APN matches a given APN included in the GTP request.

18. The apparatus of claim 1, wherein the GTP request includes an IMEI and wherein, in an event the GTP request is authenticated, the processor is further configured to:
enable the GTP tunnel to be established;
determine whether data traffic statistics, associated with user data transported over the GTP tunnel established and monitored over a time period, violate a traffic profile associated with a given ICCID or given eUICC ID, the given ICCID or eUICC ID mapped to the IMEI in a database of the interconnect network; and
in an event the data traffic statistics violate the traffic profile, (i) activate an alarm associated with the GTP tunnel established, (ii) delete the GTP tunnel established, (iii) throttle a data speed of data being transported over the GTP tunnel established, or (iv) a combination thereof.

19. The apparatus of claim 18, wherein to determine whether the data traffic statistics violate the traffic profile associated with the given ICCID or eUICC ID, the processor is further configured to:
retrieve call detail records (CDRs) associated with the given ICCID or eUICC ID from a database included in the interconnect network; and
generate the data traffic statistics from the CDRs retrieved.

20. The apparatus of claim 1, wherein the interconnect network communicatively couples a visited wireless communications network and a home wireless communications network.

21. The apparatus of claim 1, wherein the interconnect network further includes a packet data network gateway (P-GW) or gateway GPRS support node (GGSN) and wherein the apparatus is communicatively coupled to the P-GW or GGSN in the interconnect network.

22. The apparatus of claim 21, wherein the apparatus is communicatively coupled to the P-GW or GGSN via the communications interface and wherein, to block the GTP tunnel from being established, the processor is further configured to send a first control signal to the P-GW or GGSN via the communications interface, the first control signal preventing the P-GW or GGSN from establishing the GTP tunnel, and wherein, in an event the GTP request can be authenticated, the processor is further configured to send a second control signal to the P-GW or GGSN via the communications interface, the second control signal causing the P-GW or GGSN to establish the GTP tunnel.

23. The apparatus of claim 1, wherein the GTP request originates from a device that is external to the interconnect network.

24. A method for providing data access security in a communications network, the method comprising:
   authenticating, in an interconnect network of the communications network, a general packet radio service (GPRS) tunnel protocol (GTP) request to create a new session, the authenticating including authenticating network and subscriber information included in the GTP request; and
   providing the data access security by preventing access to data, accessed via the interconnect network using a GTP tunnel established for the new session, by blocking the GTP tunnel from being established in an event the GTP request cannot be authenticated;
   wherein the interconnect network is a GPRS roaming exchange (GRX) network or an internet protocol (IP) exchange (IPX) network.

25. The method of claim 24, wherein, in an event the GTP request is authenticated, the method further comprises enabling the GTP tunnel to be established.

26. The method of claim 24, wherein the network information includes a public land mobile network (PLMN) identifier and wherein authenticating the network information includes confirming that the PLMN identifier is valid.

27. The method of claim 26, wherein confirming that the PLMN identifier is valid includes confirming that the PLMN identifier is present in a list of valid PLMN identifiers included in a Global System of Mobile Communications Association (GSMA) roaming database.

28. The method of claim 27, wherein, in an event the PLMN identifier is confirmed to be valid, authenticating the network information includes confirming that a source internet protocol (IP) address of an outermost header of the GTP request belongs to a PLMN identified by the PLMN identifier.

29. The method of claim 28, further comprising confirming that the source IP address belongs to the PLMN based on data stored in a Global System of Mobile Communications Association (GSMA) roaming database.

30. The method of claim 24, wherein the subscriber information includes an international mobile subscriber identity (IMSI) and wherein authenticating the subscriber information includes verifying that the IMSI is provisioned to be enabled in the interconnect network.

31. The method of claim 30, wherein verifying that the IMSI is provisioned to be enabled in the interconnect network includes accessing a database included in the interconnect network to confirm that the IMSI is a) present among a plurality of international mobile subscriber identities (IMSIs) stored in the database and b) associated with an enabled state.

32. The method of claim 30, wherein the interconnect network is communicatively coupled to a home wireless communications network, wherein the network information includes a PLMN identifier and wherein authenticating the subscriber information includes querying the home wireless communications network to confirm that the IMSI is attached, presently, to a PLMN associated with the PLMN identifier.

33. The method of claim 32, wherein querying the home wireless communications network to confirm that the IMSI is attached, presently, to the PLMN, includes querying a Home Location Register (HLR) or Home Subscriber Server (HSS) of the home wireless communications network.

34. The method of claim 24, wherein authenticate the GTP request includes authenticating user device information included in the GTP request.

35. The method of claim 34, wherein the subscriber information includes an IMSI, wherein the user device information includes an international mobile equipment identifier (IMEI), and wherein authenticating the user device information includes validating a mapping of the IMEI to the IMSI.

36. The method of claim 35, wherein validating the mapping of the IMEI to the IMSI includes:
   determining whether there is an active GTP session associated with the IMSI and a different IMEI relative to the IMEI of the GTP request; and
   in an event such active GTP session associated with the different IMEI is determined to be active, concluding that the mapping of the IMEI to the IMSI is invalid.

37. The method of claim 34, wherein the user device information includes an IMEI and wherein authenticating the user device information further includes:
   accessing a database included in the interconnect network to determine whether the IMEI is present in the database; and
   in an event the IMEI is not present in the database, enabling the GTP tunnel to be established.

38. The method of claim 37, wherein, in an event the IMEI is present in the database, the method further includes:
   determining whether the IMEI is mapped, in the database, to at least one IMSI; and
   in an event the IMEI is not mapped to any IMSI in the database, enabling the GTP tunnel to be established.

39. The method of claim 38, wherein the subscriber information includes an IMSI and wherein, in an event the IMEI is mapped to the at least one IMSI in the database, the method further includes:
   determining whether the IMEI matches an integrated circuit card identifier (ICCID) or an embedded universal integrated circuit card (eUICC) identifier (ID) that is mapped, in the database, to the IMSI included in the subscriber information of the GTP request;
   wherein, in an event (i) the IMEI does match the ICCID or eUICC ID and (ii) the ICCID or eUICC ID is mapped to a radio access type (RAT) in the database, the method further includes determining whether the RAT matches a given RAT included in the GTP request; and
   wherein, in an event (iii) the IMEI does match the ICCID or eUICC ID and (iv) the ICCID or eUICC ID is mapped to an access point name (APN) in the database, the method further includes determining whether the APN matches a given APN included in the GTP request.

40. The method of claim 24, wherein the subscriber information includes an IMSI and wherein the method further includes:
   authenticating the GTP request by accessing a database included in the interconnect network to determine whether the IMSI is mapped to a RAT or APN;
   wherein, in an event the IMSI is mapped to the RAT, the method further includes determining whether the RAT matches a given RAT included in the GTP request; and wherein, in an event the IMSI is mapped to the APN, the method further includes determining whether the APN matches a given APN included in the GTP request.

41. The method of claim 24, wherein the GTP request includes an IMEI and wherein, in an event the GTP request is authenticated, the method further comprises:
enabling the GTP tunnel to be established;
determining whether data traffic statistics, associated with user data transported over the GTP tunnel established and monitored over a time period, violate a traffic profile associated with a given ICCID or given eUICC ID, the given ICCID or eUICC ID mapped to the IMEI in a database of the interconnect network; and
in an event the data traffic statistics violate the traffic profile, (i) activating an alarm associated with the GTP tunnel established, (ii) deleting the GTP tunnel established, (iii) throttling a data speed of data being transported over the GTP tunnel established, or (iv) a combination thereof.

42. The method of claim 41, wherein determining whether the data traffic statistics violate the traffic profile associated with the given ICCID or eUICC ID includes:
retrieving call detail records (CDRs) associated with the given ICCID or eUICC ID from a database included in the interconnect network; and
generating the data traffic statistics from the CDRs retrieved.

43. The method of claim 24, wherein the interconnect network communicatively couples a visited wireless communications network and a home wireless communications network.

44. The method of claim 24, wherein the interconnect network further includes a packet data network gateway (P-GW) or gateway GPRS support node (GGSN) and wherein the authenticating and providing are performed by an apparatus communicatively coupled to the P-GW or GGSN in the interconnect network.

45. The method of claim 44, wherein the apparatus is communicatively coupled to the P-GW or GGSN via a communications interface and wherein blocking the GTP tunnel from being established includes sending a first control signal to the P-GW or GGSN via the communications interface, the first control signal preventing the P-GW or GGSN from establishing the GTP tunnel, and wherein, in an event the GTP request can be authenticated, the method further comprises sending a second control signal to the P-GW or GGSN via the communications interface, the second control signal causing the P-GW or GGSN to establish the GTP tunnel.

46. The method of claim 24, wherein the GTP request originates from a device that is external to the interconnect network.

47. A non-transitory computer-readable medium for providing data access security in a communications network, the non-transitory computer-readable medium having encoded thereon a sequence of instructions which, when loaded and executed by at least one processor, causes the at least one processor to:
authenticate, in an interconnect network of the communications network, a general packet radio service (GPRS) tunnel protocol (GTP) request to create a new session by authenticating network and subscriber information included in the GTP request; and
provide the data access security by preventing access to data, accessed via the interconnect network using a GTP tunnel established for the new session, by blocking the GTP tunnel from being established in an event the GTP request cannot be authenticated;
wherein the interconnect network is a GPRS roaming exchange (GRX) network or an internet protocol (IP) exchange (IPX) network.

* * * * *